United States Patent

Fujioka

[11] Patent Number: 5,371,688
[45] Date of Patent: Dec. 6, 1994

[54] ESTIMATED VEHICLE SPEED COMPUTING DEVICE

[75] Inventor: Hideaki Fujioka, Itami, Japan

[73] Assignee: Sumitomo Electric Industries, Ltd., Osaka, Japan

[21] Appl. No.: 183,892

[22] Filed: Jan. 21, 1994

Related U.S. Application Data

[63] Continuation of Ser. No. 748,966, Aug. 23, 1991, abandoned.

[30] Foreign Application Priority Data

Aug. 30, 1990 [JP]  Japan ................................. 2-230885

[51] Int. Cl.$^5$ ................................................ G01P 3/56
[52] U.S. Cl. .................................................... 364/565
[58] Field of Search ........................ 364/426.02, 565; 303/109

[56] References Cited

U.S. PATENT DOCUMENTS

| | | | |
|---|---|---|---|
| 4,015,042 | 5/1991 | Yoshino | 303/96 |
| 4,760,893 | 8/1988 | Sigl et al. | 180/197 |
| 4,836,619 | 6/1989 | Muto | 303/109 |
| 4,877,295 | 10/1989 | Yoshino | 303/109 |
| 4,957,329 | 9/1990 | Matsuda . | |
| 5,016,179 | 5/1991 | Utzt | 364/426.02 |
| 5,179,526 | 1/1993 | Zimmer et al. | 364/565 |
| 5,181,174 | 1/1993 | Matsuda et al. | 364/426.02 |

*Primary Examiner*—Jack B. Harvey
*Assistant Examiner*—Thomas Peeso
*Attorney, Agent, or Firm*—Sandler, Greenblum & Bernstein

[57] ABSTRACT

An estimated vehicle speed computing device computes an estimated vehicle speed based on a computed non-drive wheel speed and a computed drive wheel speed of the vehicle. A first computed vehicle speed is computed based on the drive wheel speed and a second computed vehicle speed is computed based on the non-drive wheel speeds. When the first computed vehicle speed increase more than a predetermined level, the second computed vehicle speed is employed as the estimated vehicle speed. Furthermore, when the second computed vehicle speed is greater than the drive wheel speed, a speed other than the second computed vehicle speed is employed as the estimated vehicle speed.

9 Claims, 6 Drawing Sheets

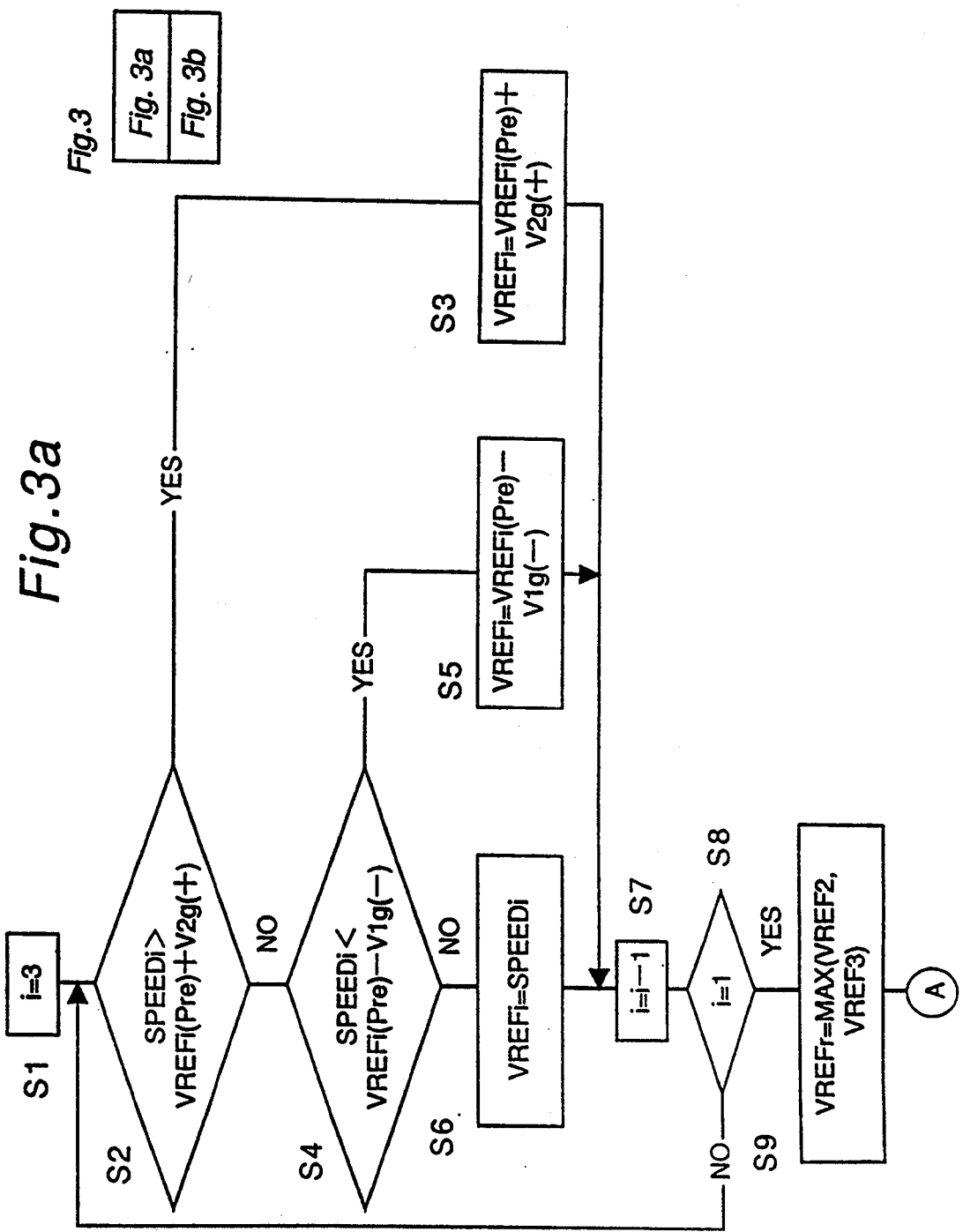

ESTIMATED VEHICLE SPEED COMPUTING DEVICE

This application is a continuation of application Ser. No. 07/748,966, filed Aug. 23, 1991, now abandoned.

BACKGROUND OF THE INVENTION

1. Field of the Invention

The present invention relates to an estimated vehicle speed computing device which estimates the vehicle speed from the rotational velocity of the wheels and, more particularly, to an estimated vehicle speed computing device particularly suitable for use in an anti skid brake control system.

2. Description of the Prior Art

An anti skid brake control system (ABS) compares the rotational velocity of a wheel with the vehicle speed to detect symptoms of wheel locking. When these symptoms are detected, the ABS overrides the driver's operation to apply braking, automatically reduces the brake pressure and weaken the braking effect, thus relaxing the locking tendency of the wheels. To detect these wheel locking symptoms, it is necessary to know the vehicle speed and the most common method used is to estimate the vehicle speed from the wheel velocity.

As shown in FIG. 5, however, because it is not possible for the vehicle speed to rise as quickly as the rotational velocity of the drive wheel during sudden acceleration, the drive wheel spins and the vehicle gradually accelerates until a stable, constant relationship between the rotational velocity of the drive wheel and the vehicle speed is established. If the vehicle speed is estimated based upon the rotational velocity of the drive wheel during rapid acceleration, there will be a major difference between the estimated and actual vehicle speeds, and the estimated vehicle speed will have no practical meaning. Methods were therefore proposed, in U.S. Pat. No. 4,957,329 issued on Sep. 18, 1990, to prevent this large difference by prohibiting the output of the estimated vehicle speed for a constant period Tp after rapid vehicle acceleration was detected, and to estimate the vehicle speed after the passage of this predetermined wait period.

However, because the vehicle speed during rapid acceleration and the rotational velocity of the drive wheel change as shogun in FIG. 5, if the output of the estimated vehicle speed is simply prohibited for a constant period Tp after rapid vehicle acceleration is detected, if the convergence between drive wheel and vehicle speed is delayed, i.e., if spinning of the drive wheel does not end within the period of Tp but ends at time α passed after the period Tp, the estimated vehicle speed will be greater than the actual speed, causing locking symptoms to be erroneously detected and an brake pressure to be unnecessarily reduced.

SUMMARY OF THE INVENTION

The object of the present invention is therefore to provide an estimated vehicle speed computing device which solves these problems.

In order to achieve the aforementioned objective, an estimated vehicle speed computing device for computing an estimated vehicle speed based on a drive wheel speed and a non-drive wheel speed of the vehicle comprises a first computing means for computing a first computed vehicle speed based on data other than the non-drive wheel speed, a first judging means for Judging whether a change of the first computed vehicle speed per unit time is greater than a predetermined level or not, a second computing means for computing a second computed vehicle speed based on the non-drive wheel speeds, a second judging means for judging whether the second computed vehicle speed is greater than the drive wheel speed or not, and an estimated vehicle speed setting means for setting an estimated vehicle speed.

The estimated vehicle speed setting means sets the estimated vehicle speed such that when the first judging means judges that a change of the first computed vehicle speed per unit time is greater than the predetermined level, the second computed vehicle speed is employed as the estimated vehicle speed and when the second judging means judges that the second computed vehicle speed is greater than the drive wheel speed, the second computed vehicle speed is employed as the estimated vehicle speed.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIGS. 3a and 3b are a flow chart showing the operation of the estimated vehicle speed computation according to a preferred embodiment of the present invention.

DETAILED DESCRIPTION OF THE PREFERRED EMBODIMENTS

Figure 1:
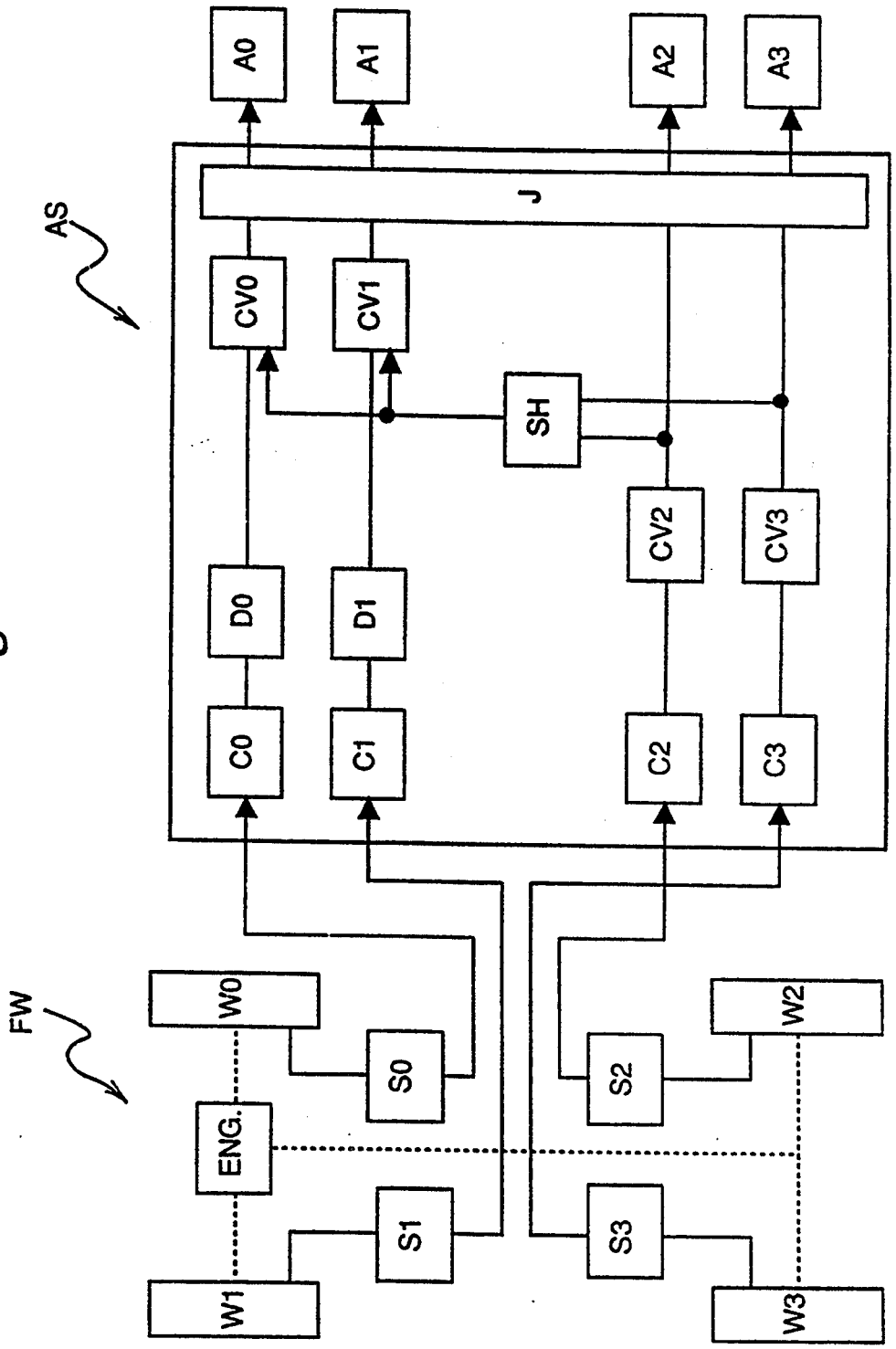
FIG. 1 is a block diagram showing the constitution of an anti skid control brake system in use for a vehicle of the front wheel drive.

Referring to FIG. 1, a block diagram of an anti skid control brake system in which an estimated vehicle speed computing device according to a preferred embodiment of the present invention is incorporated is shown.

A front wheel drive vehicle FW has a front right drive wheel W0, a front left drive wheel W1, a rear right non-drive wheel W2, and a rear left non-drive wheel W3. It is to be noted that each of suffixes of 0, 1, 2, and 3 in FIG. 1 represents the front right wheel, the front left wheel, the rear right wheel and the rear left wheel, respectively, Furthermore, the vehicle FW has wheel speed sensors S0, S1, S2, and S3 provided for detecting the respective wheel speeds of wheels W0 to W3 and producing respective signals indicative of wheel speeds SPEED0, SPEED1, SPEED2, and SPEED3.

An anti skid brake control system unit AS includes calculation units C0, C1, C2, and C3 which calculate respective wheel speeds SPEEDi (i=0, 1, 2, or 3) and respective wheel acceleration/deceleration rates DSPEDi (i=0, 1, 2, or 3) based on each of wheels W0, W1, W2, and W3 in response to the signals from the wheel speed sensors S0 to S3 and produce signals indicative of respective wheel speeds SPEEDi and wheel acceleration/deceleration rates DSPEDi; and drive wheel spin behavior detection units D0 and D1 which detect the wheel spin behaviors of drive wheels W0 and W1 to produce signals indicative of wheel spin behavior of drive wheels W0 and W1 in response to the signals from the calculating units C0 and C1. The system unit AS further includes estimated vehicle speed computing units CV2 and CV3 which compute estimated vehicle speed VREFi (i=2 or 3) based on the non-drive wheels W2 and W3 in response to the signals from the calculating units C2 and C3, and produce signals indicative of respective estimated vehicle speed VREFi; a selection unit SH which selects either of signals indicative of the estimated vehicle speeds VREF2 and VREF3 whichever is greater than the other and further generate a selection result signal; estimated vehicle speed computing units CV0 and CV1 which calculate the estimated vehicle speed VREFi (i=0,1) based on the drive wheels W0 and W1 in response to the signals through the drive wheel spin behavior detectors D0 and D1 and from the selection unit SH and further produce signals indicative of respective estimated vehicle speed VREF0 and VREF1; and a brake pressure control unit J which determines whether the brake pressure for each of wheels W0, W1, W2, and W3 should be increased or decreased in response to the signals from the estimated vehicle speed computers CV0, CV1, CV2 and CV3.

The brake pressure controller J is connected to each of the brake pressure control actuators A0, A1, A2 and A3 which control the brake pressure at each of wheels W0, W1, W2, and W3. In the above configuration, it is preferred that calculating units C0, C1, C2, and C3, computing units CV0, CV1, CV2, and CV3, behavior detection units D0 and D1, and brake pressure control unit J may be configured by a microcomputer.

Figure 2:
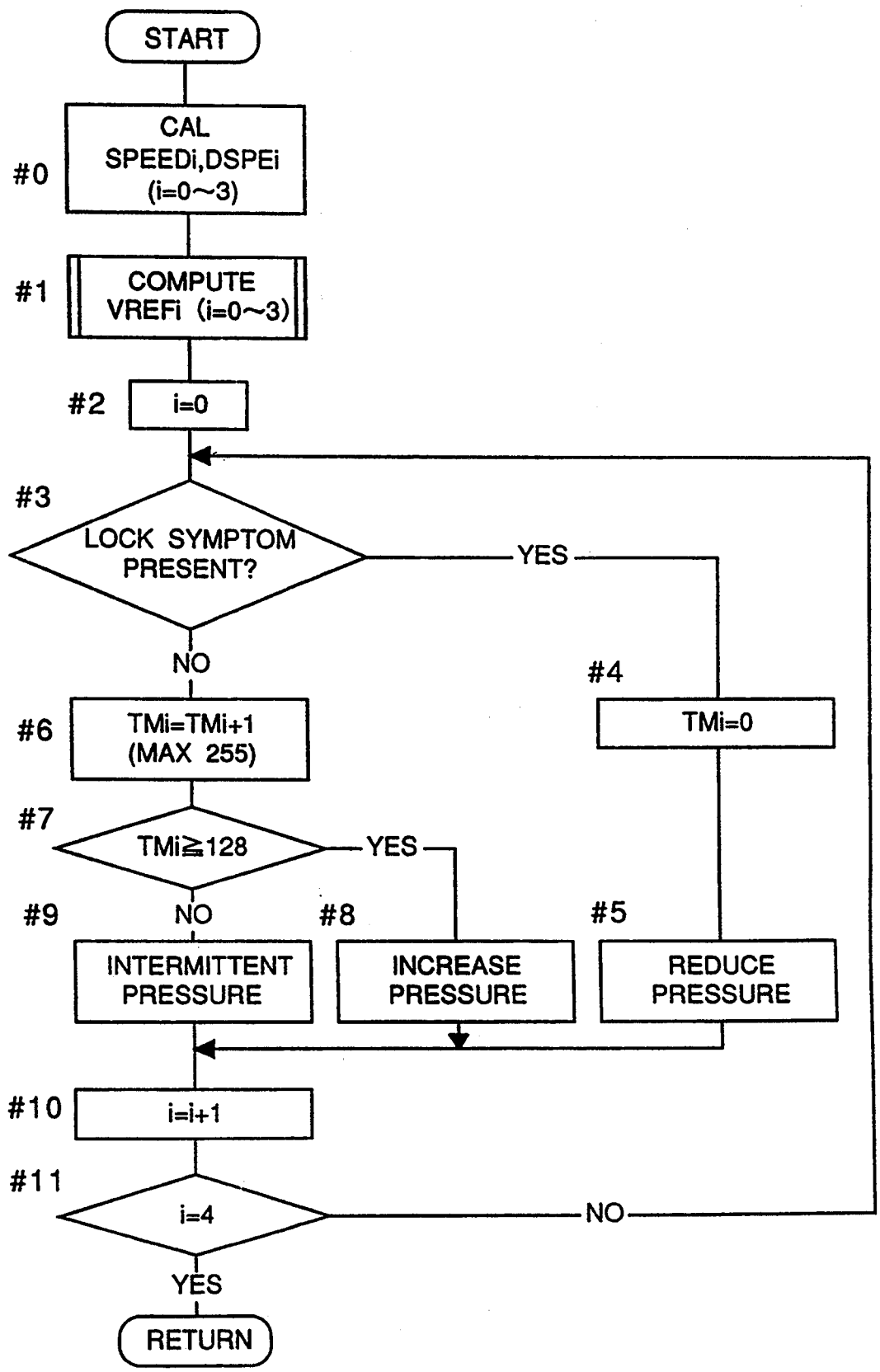
FIG. 2 is a flowchart showing the operation of an anti skid control brake system of FIG. 1.

Referring to FIG. 2, the operation of brake pressure control by the anti skid control system of FIG. 1 is shown. It is to be noted that the preferred embodiment is described with reference to an application in a front wheel drive vehicle, but it will be obvious to those skilled in the art that it can also be configured for application in a rear wheel drive vehicle and other vehicle types.

At step #0, the wheel speeds SPEEDi and wheel acceleration/deceleration rates DSPEDi in respect to wheels Wi is calculated by a method of common knowledge. It is to be noted that suffix "i" is a variable value selected from the range of 0, 1, 2, and 3 which identifies the wheel on which the operation sequence is acting.

At step #1, the estimated vehicle speed VREFi is computed by the method which will be described hereinafter in detail with reference to the flow chart in FIG. 3.

At step #2, the variable i used to identify the specific wheel is initialized to i=0, thereby causing the control sequence to begin at the front right drive wheel W0.

At step #3, the presence of any locking symptoms detected in respect to the front right wheel W0. In this embodiment, locking symptoms are regarded as being present when the following equations (1) and (2) are both simultaneously satisfied, but a different method of common knowledge may also be applied.

$$VREFi - SPEEDi \geq (VREFi/16) + 5 \quad (1)$$

$$DSPEDi \leq -1.5\,g \quad (2)$$

It is to be noted that the constants 16, 5, and −1.5 used in equations (1) and (2) above are one set of constants, and that other values can also be applied.

If "LOCKING SYMPTOM IS PRESENT" is judged "YES" at step #3 when the locking symptom is detected, the anti skid control timer TMi (i=0) applied for the front right wheel W0 is cleared at step #4, and then a pressure reduce command is output to the brake pressure control actuator Ai (i=0) at step #5, thereby starting the anti skid control with respect to the front right wheel W0. Thenafter, the procedure advances to step #10 after anti skid brake control begins.

However, if "LOCKING SYMPTOM IS PRESENT" is judged "NO" at step #3 when the locking symptom is not detected, the anti skid control timer TMi (i=0) is incremented by "1" at step #6 and then the procedure advances to the step #7 where it is judged whether the anti skid control timer TMi (i=0) value is greater than a predetermined value, e.g., 128 or not.

If "TMi ≧ 128" is judged "YES" at step #7 when the anti skid control timer value TMi (i=0) is greater 128, at step #8 a pressure increase command is output to the brake pressure control actuator Ai (i=0) such that the brake pedal pressure will be applied directly to the brake for the wheel W0. Thus, the procedure then advances to step #10 without starting the anti skid brake control.

If "TMi ≧ 128" is judged "NO" at step #7 when the anti skid control timer TMi is less than 128, it is considered that the anti skid brake control is still in effective. Then, the procedure advances to step #9 and an intermittent pressure increase con, and is output to the brake pressure control actuator Ai (i=0) such that the brake pressure rises gradually. Thenafter the procedure advances to step #10.

At step #10, the variable "i" is incremented by "1" and the procedure advances to step #11. It is to be noted that "i" becomes "1" and hereafter "i" identifies the front left wheel W1.

At step #11 , if "i=4" is judged "No" when the variable "i"=1 as a result of increment at step #10, the procedure loops back to step #3 and the same control sequence of step #3 to step #10 is repeated for the next wheel W1.

At step #10, the variable "i" is incremented to 2 and then the rear right wheel W2 is identified for the next wheel to be applied with the control sequence. Since the variable i is 2, the procedure loops back from step #11 to step #3 again. The same control sequence is repeated in respect to the wheel W2 this time.

In the same manner as described in the above, at step #10 of next procedure steps, the variable "i" is incremented to "3" and the procedure loops back from step #11 to step #3 and the same control sequence is repeated in respect to the rear left wheel W3.

Since at step #10 the variable "i" is incremented to "4" this time, "i=4" is judged "YES" and the procedure returns to "START". In this case, the procedure repeats the steps beginning from step #0 and the variable "i" will be initialized to 0 again. Thus, the control sequence returns to the front right wheel W0 and is repeated for each of wheels W0, W1, W2, and W3 in the above described manner.

It is to be noted that the sequence from step #0 to step #11 is referred to as one system cycle, and the sequence from step #3 to step #11 as one AL cycle. Thus, the AL cycle is repeated four times in one system cycle.

Figure 3B:
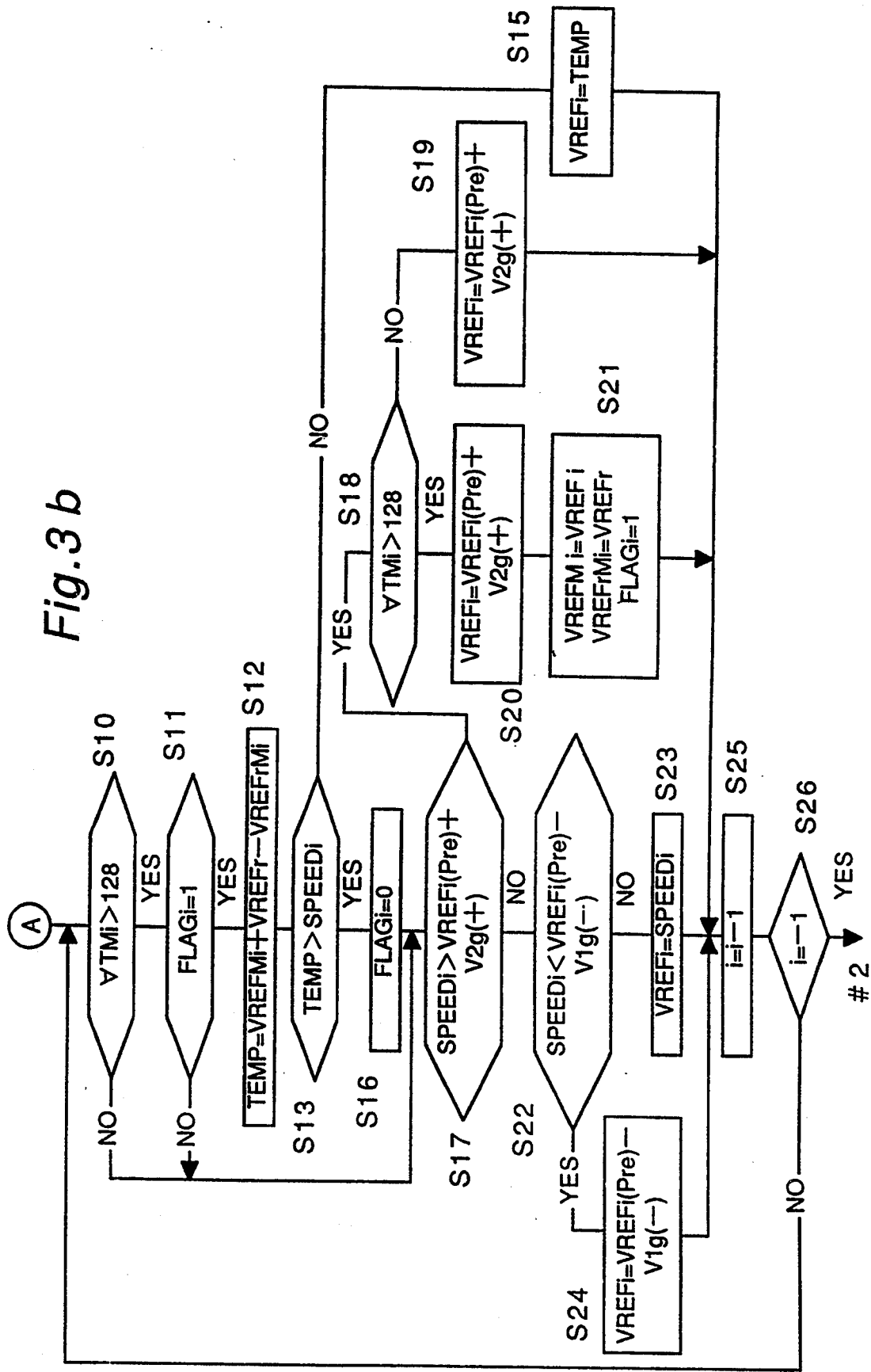

Referring to FIG. 3, the computation operation of the estimated vehicle speed VREFi which is shown at step #1 in FIG. 2 is described below. In this flow chart the sequence from step S1 to S9 (shown in FIG. 3a) is applied to the non-drive wheels W2 and W3, and the sequence from step S10 to S26 (shown in FIG. 3b) is applied to the drive wheels W0 and W1 to obtain the estimated vehicle speeds VREFi therefrom, respectively.

At step S1, the variable "i" is initially set to "3" to start the operation sequence from the rear left non-drive wheel W3.

At step S2, the wheel speed SPEED3 obtained from the current system cycle is evaluated to judge if it is greater than the sum value equal to the maximum accelerated speed $V2\ g(+)$ and the estimated vehicle speed VREF3 obtained in the previous system cycle, i.e., if $$SPEED3 > VREF3(previous) + V2g(+).$$

In this equation the maximum acceleration $V2g(+)$ is the speed resulting from acceleration at twice gravitational acceleration "g" for the period of one system cycle $\Delta T(S)$, and is expressed by equation (3):

$$V2g(+) = 2 \times 9.8\ m/S^2 \times \Delta T \quad (3)$$

Because it may be assumed that a vehicle does not actually accelerate at an acceleration of 2g, and even if the wheels themselves do accelerate at 2 g or greater actual vehicle acceleration will be less than 2 g even allowing for generously fast acceleration, the current estimated vehicle speed VREF3 in this case is defined as the estimated vehicle speed during the previous system cycle plus the speed equivalent to 2 g acceleration, i.e., maximum acceleration $V2g(+)$. It is to be noted that the value of the maximum acceleration shall not be restricted to the equivalent of 2 g acceleration, and a variety of other values may be applied according to the road surface and the control status.

At step S2, if "SPEEDi > VREFi (previous) + V2 g(+)" is judged "YES", the procedure advances to step S3 where the value equal to the maximum acceleration $V2\ g(+)$ added to the estimated vehicle speed VREF3 obtained in the previous system cycle is set as the current estimated vehicle speed VREF3 of the current system cycle as shown by the following equation:

$$VREF3 = VREF3(previous) + V2g(+).$$

At step S2, if "SPEEDi > VREFi (previous) + V2g(+)" is judged "NO", the procedure advances to step S4 where it is judged whether SPEED3 is less than the estimated vehicle speed VREF3 obtained in the previous system cycle minus the maximum deceleration speed $V1\ g(-)$ or not, i.e., if $$SPEED3 < VREF3\ (previous) - V1\ g(-).$$

The maximum deceleration $V1\ g(-)$ used here is the speed obtained from deceleration at gravitational acceleration for the period of one system cycle $\Delta T(S)$, and is expressed by equation (4):

$$V1\ g(-) = 1 \times 9.8\ m/S^2 \Delta T \quad (4).$$

Because it may be assumed that a decelerating vehicle does not slow at a deceleration rate greater than 1g, and even if the wheels decelerate at a deceleration rate greater than 1g with wheel lock symptoms, the actual vehicle deceleration should be less than 1g. Thus, as a maximum decelerated speed, the value of the previous estimated vehicle speed minus the speed equivalent to deceleration at 1g, i.e., minus maximum deceleration $V1\ g(-)$ is adopted, It is to be noted that as with acceleration above, the value of the maximum deceleration shall not be limited to deceleration at 1g, but a variety of other values may be applied according to the road surface and the control status.

At step S4, if "SPEED3 < VREF3(previous) − V1g(−)" is judged "YES", the procedure advances to step S5 where the value equal to the estimated vehicle speed VREF3 obtained in the previous system cycle minus maximum deceleration $V1\ g(-)$ is set as the current estimated vehicle speed VREF3, and expressed as:

$$VREF3 = VREF3\ (previous) - V1\ g(-).$$

However, at step S4 "SPEED3 < VREF3(previous) − V1g(−)" is judged "NO", the procedure advances to step S6 where the current computed wheel speed SPEED3 is set as the estimated vehicle speed VREF3, and expressed as:

$$VREF3 = SPEED3.$$

At step S7, the variable "i" is decremented from 3 to 2, and expressed as i = 3 − 1.

At step S8, it is judged whether the variable "i" is 1 or not. Since "i" is 2 in this case, "i = 1" is judged "NO" and the procedure returns to step S2. Thereafter the above sequence from step S2 to step S7 is executed again but for the rear right wheel W2. At step S7, since the variable "i" is again decremented by 1, "i" becomes 1 from 2. Therefore, "i = 1" is judged "YES" and the procedure advances to step S9 but not to step S2 this time. Thus, the sequence from step S2 to step S8 is the cycle used to compute the estimated vehicle speed based on the wheel speed of the non-drive wheels W3 and W2, resulting in the two estimated vehicle speeds VREF3 and VREF2.

Hereinafter described is the sequence from step S9 to step S26 which is the cycle used to compute the estimated vehicle speed based on the wheel speed of the drive wheels W0 and W1. Because the variable "i" is already set to 1 at this point, the operation is first applied to the front left drive wheel W1.

At step S9, the greater of the two estimated vehicle speeds VREF2 and VREF3 obtained at step S1 to step S8 based on the right and left non-drive wheels W2 and W3 is set as VREFr. This so-called "select high" operation is executed because in actuality the non-drive wheel speed cannot be greater than the vehicle speed, and it is therefore more appropriate to adapt the greater of the two non-drive wheel based estimated vehicle speeds as the estimated vehicle speed.

At step S10 it is judged whether all of the anti skid control timer values TM0, TM1, TM2, and TM3 for the drive wheels W0 and W1 and the non-drive wheels W2 and W3 are greater than the predetermined value, 128 or not. If "∀ TMi>128" is judged "YES", no anti skid brake control is applied to any of the wheels W0 to W3, and then the procedure advances to step S11. However, "∀ TMi>128" is judged "NO", i.e., anti skid brake control is being applied to at least one wheel, and the procedure advances to step S17.

At step S11, it is judged whether a flag indicating that drive wheels W1 is spinning more than a predetermined amount is set or not. If "FLAG1=1" is judged "NO", i.e., the spinning of drive wheel W1 in the previous system cycle was less than the predetermined amount, the procedure advances to step S17. However, if "FLAG1=1" is judged "YES", i.e., the drive wheel is spinning more than a predetermined amount, the procedure advances to step S12.

At step S12, the TEMP value defined as $$TEMP = VREFM1 + VREFr - VREFrM1 \quad (5)$$

is set, and the procedure advances to step S13.

TEMP is a temporary estimated vehicle speed which is defined as the estimated vehicle speed based on the drive wheel W1 while the flag FLAG1 is set. VREFM1 is the estimated vehicle speed VREF1 based on the drive wheel W1, which is computed and stored when the flag FLAG1 is set. VREFr is the estimated vehicle speed VREF2 or VREF3 based on the corresponding non-drive wheels W2 and W3, which is selected as greater than the other at step S9. VREFrM1 is the estimated vehicle speed VREFr based on the non-drive wheels W2 and W3 which is computed and stored when the flag FLAG1 is set.

At step S13 it is judged whether the temporary estimated vehicle speed TEMP obtained at step S12 is greater than the drive wheel speed SPEED1 or not. If "TEMP>SPEED1" is judged "YES", the procedure advances to step S16 where the flag FLAG1 is reset to 0. If "TEMP>SPEED1" is judged "NO", i.e., when the temporary estimated vehicle speed TEMP is less than the drive wheel speed SPEED1, the procedure advances to step S15.

At step S15 the TEMP value is set as the estimated vehicle speed VREF1 based on the drive wheel W1, and the procedure advances to step S25.

As thus described, if anti skid brake control is being applied to even one of the four wheels W0 to W3, the sequence advances directly from step S10 to step S17. This is to prevent the temporary estimated vehicle speed TEMP computed at step S12 from being used as the estimated vehicle speed VREFi when anti skid brake control is applied to even one brake, even during sudden "jack-rabbit" starts or sudden acceleration. If the temporary estimated vehicle speed TEMP is used as the estimated vehicle speed when anti skid brake control is applied to even one brake, the estimated vehicle speed VREF1 based on the drive wheel W1 will also drop when any of non-drive wheels W2 and W3 show locking symptoms. From this reason, detection of locking symptoms in the drive wheels W0 and W1 will be delayed as described hereinafter with reference to FIG. 6.

At step S17, it is judged whether the drive wheel speed SPEED1 is greater than the estimated vehicle speed VREF1 based on the drive wheel W1 obtained in the previous system cycle plus the maximum acceleration speed V2g(+) or not. If "SPEED1>VREF1 (previous)+V2 g(+)" is judged "YES", i.e., the drive wheel W1 is spinning more than a predetermined amount and is losing the grip relative to the road, the procedure advances to step S18. If "SPEED1>VREF1 (previous)+V2 g(+)" is judged "NO", i.e., the spinning of drive wheel W1 is within an allowable range, the procedure advances to step S22.

At step S18, it is judged whether all anti skid control timer values TM0 to TM3 are greater than the predetermined amount or not. If "∀ TMi>128" is judged "NO" when at least one of anti skid control timers TM0 to TM3 is less than 128, the procedure advances to step S19.

At step S19, the speed equal to the maximum acceleration V2g(+) added to the estimated vehicle speed VREF1 based on the drive wheel W1 obtained in the previous system cycle is set as the estimated vehicle speed VREF1 based on the drive wheel W1, which is expressed by:

$$VREF1 = VREF1 \text{ (previous)} + V2\,g(+),$$

and the procedure advances to step S25.

However, at step S18, if "∀ TMi>128" is judged "YES" when all anti skid control timers TM0 to TM3 is greater than 128, the procedure advances to step S20

At step S20, the speed equal to the maximum acceleration V2g(+) added to the estimated vehicle speed VREF1 based on the drive wheel W1 obtained in the previous system cycle is set as the estimated vehicle speed VREF1 based on the drive wheel W1, which is expressed by:

$$VREF1 = VREF1 \text{ (previous)} + V2g(+),$$

and the procedure advances to step S21.

At step S21, the estimated vehicle speed VREF1 based on the drive wheel W1 is stored as VREFM1, the estimated vehicle speed VREFr based on the non-drive wheel W2 or W3 is stored as VREFrM1, and the flag FLAG1 is set to 1 because it is judged at step S17 that the drive wheel W1 spins too much to maintain a grip relative to the road, and then the procedure advances to step S25.

At step S22, it is judged whether the wheel speed SPEED1 of the drive wheel W1 is less than the estimated vehicle speed VREF1 obtained in the previous system cycle minus the maximum deceleration speed V1g(−) or not. If "SPEED1<VREF1 (previous)−V1g(−)" is judged "YES", i.e., drive wheel W1 is too much decelerated beyond the maximum deceleration and is locked to lose the grip relative to the road, the procedure advances to step S24. If "SPEED1<VREF1 (previous)−V1g(−)" is judged "NO", i.e., the deceleration of the drive wheel W1 is within the allowable range, the procedure advances to step S23.

At step 23, the wheel speed SPEED1 is set as the estimated vehicle speed VREF1 based on the drive wheel W1, and the procedure advances to step S25.

At step 24, the estimated vehicle speed based on the drive wheel W1 which is obtained in the previous system cycle minus the maximum deceleration is set as the estimated vehicle speed VREF1 of the current system cycle, and is expressed by:

$$VREF1 = VREF1 \text{ (previous)} - V1g(-),$$

and the procedure advances to step S25.

At step S25, the variable "i" is decremented by 1 so that "i" becomes 0 from 1 and the procedure advances to step S26.

At step S26, it is judged whether the variable "i" is −1 or not. Since "i" is 0 in this case, "i=−1" is judged "NO" and the procedure returns to step S10. Thereafter the above sequence from step S10 to step S25 is executed again but for the front right wheel W0. At step S25, since the variable "i" is again decremented by 1, "i" becomes −1 from 0.

At step S26, therefore, "i=−1" is judged "YES" and the procedure advances to step #2 of the system cycle but not to step S10 this time. Thus, at step #2 for one system cycle, the current estimated vehicle speeds VREF0, VREF1, VREF2, and VREF3 are obtained.

Figure 4:
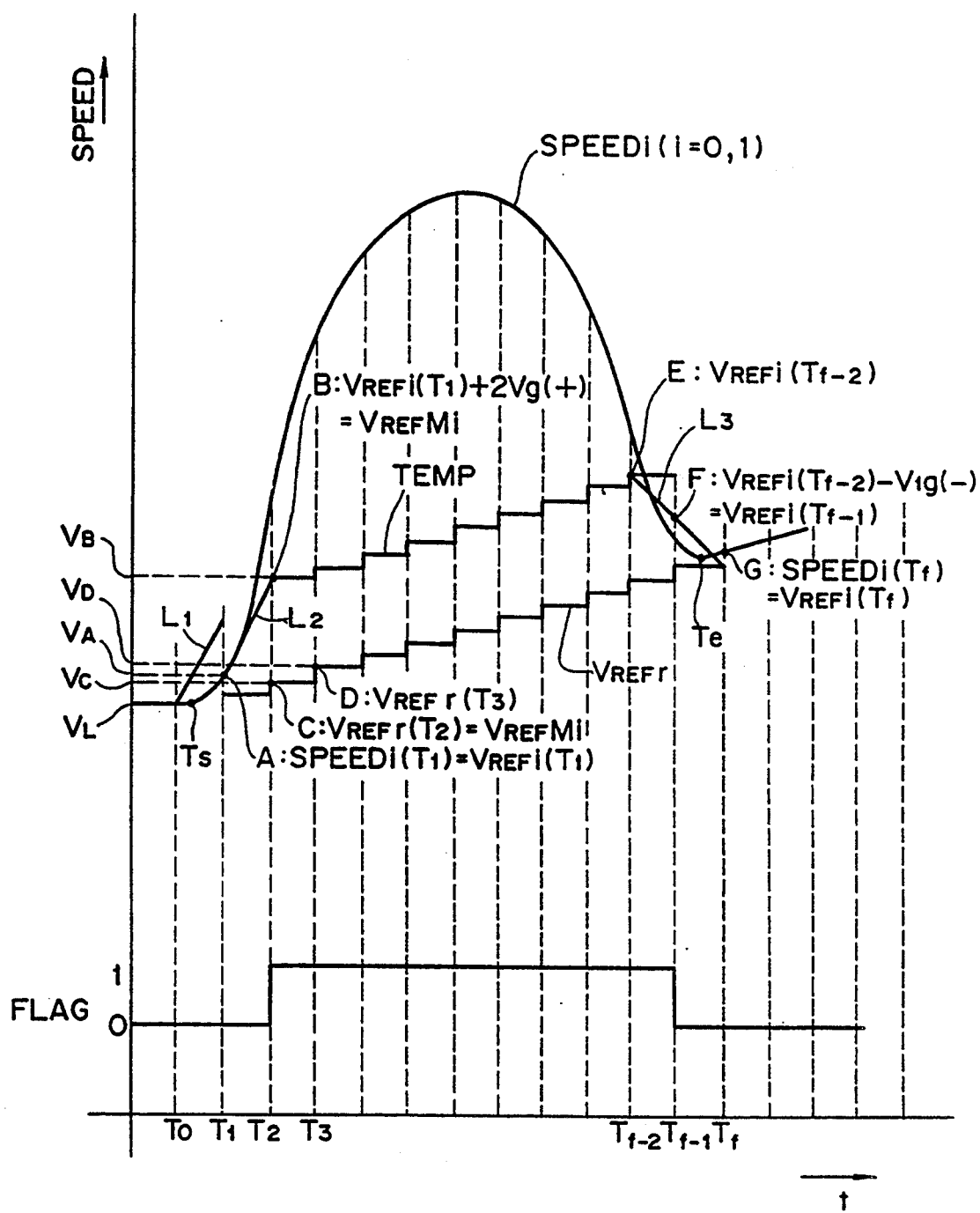
FIG. 4 is a graph showing the relationship between the wheel speed and the estimated vehicle speed computed by the estimated vehicle speed computing device according to a preferred embodiment of the present invention.
Figure 5:
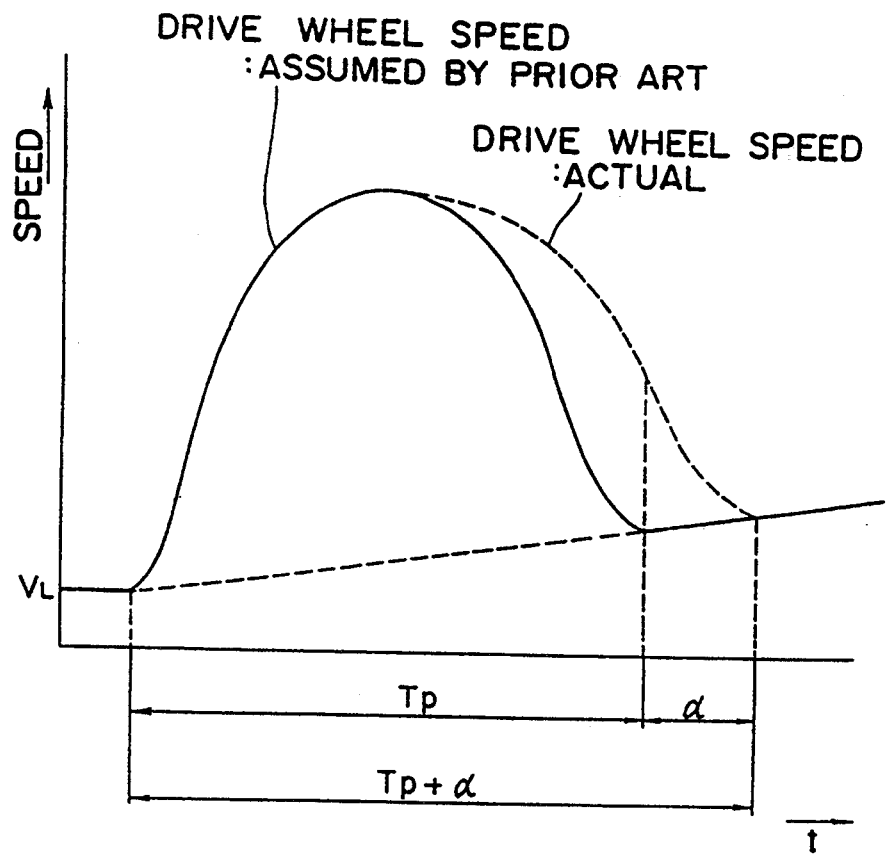
FIG. 5 is a graph showing the relationship between the actual speed of the driving wheels and the speed of the driving wheels estimated by the estimated vehicle speed computing device of the prior art.

Referring to FIG. 4, a specific example of the estimated vehicle speed computation operation is described hereinbelow.

In FIG. 4, it is assumed that a vehicle is travelling at a constant low speed VL and suddenly accelerates at time TS, thus causing the drive wheels to spin more than a predetermined amount. Thereafter the vehicle speed also rises with the passage of time and the spinning of the drive wheels eventually drops below the predetermined amount at time Te, after which a constant relationship is again established between the wheel speed of the drive wheel and the vehicle speed.

As shown in FIG. 4, the drive wheel speed SPEEDi is represented by a curved line, the estimated vehicle speed VREFr based on the non-drive wheels W2 and W3 is represented by a stepped line which locates the bottom of the drive wheel speed SPEEDi, the estimated vehicle speed VREFi which is computed according to the present invention is represented by another stepped line over the estimated vehicle speed VREFr, and the flag FLAGi showing that the drive wheel is spinning more than a predetermined amount is represented by a bent line below the other lines.

It is to be noted that the temporary estimated vehicle speed TEMP is the same as the estimated vehicle speed VREFi. The time points $T_0$, $T_1$, $T_2$ ... $T_{f-2}$, $T_{f-1}$, and $T_f$ correspond to the system cycle control timing. The operation of estimated vehicle speed computation at each time point is described hereinbelow.

Time $T_o$

At time $T_0$, the estimated vehicle speed VREFi and the drive wheel speed SPEEDi are approximately the same values because the vehicle is travelling at a constant low speed VL. Therefore, the control sequence at time $T_o$ repeats twice the loop through steps S2, S4, S6, S7, and S8 for respective non-drive wheels W3 and W2, and then advances through S9 to S10, and then repeats twice the loop through S10, S11, S17, S22, S23, S25, and S26 for respective drive wheels W1 and W0, after which the procedure advances through step #2 to the AL cycle.

In other words, because the vehicle is travelling at a constant low speed until time $T_0$, locking symptoms are not detected at step #3 in the AL cycle and the procedure therefore advances to step #6 without going through step #4 where the anti skid control timer TMi is cleared. At step #6, since the anti skid control timer TMi has been incremented by 1 and the maximum limit of 255 is already reached.

In addition to the above, both step S2 and S4 return a "NO" result, respectively. At step S6, the wheel speeds SPEEDi of the non-drive wheel W2 or W3 is set as the estimated vehicle speed VREFi based on the non-drive wheel W2 or W3, steps S7 and S8 are passed, and at step S9 the greater of the two estimated vehicle speeds VREF2 and VREF3 based on the corresponding non-drive wheels W2 and W3 is set as the estimated vehicle speed VREFr based on the non-drive wheels. Because the anti skid control timer TMi is up to the maximum value of 255 and the flag is not set to 1, step S10 returns a "YES" result and S11 returns a "NO", causing the procedure to advance to step S17. Both steps S17 and S22 return a "NO", and the control procedure advances to step S23. At step S23 the drive wheel speed SPEEDi is set as the estimated vehicle speed VREFi based on the drive wheel W0 or W1. In the AL cycle, the same operation as in the previous system cycle is performed.

It is to be noted that the estimated vehicle speed VREFr based on the non-drive wheel and the estimated vehicle speed VREFi based on the drive wheel obtained at time $T_0$ are expressed as VREFr($T_0$) and VREFi($T_0$), respectively. A similar time code is hereinafter appended to the obtained data in the following description.

Time $T_1$

The control sequence at time $T_1$ starts from S1 and repeats twice the loop through steps S2, S4, S6, S7, and S8, and then advances through step S9 to step S10 for respective non-drive wheels W3 and W2, and further repeats twice the loop through steps S10, S11, S17, S22, S23, S25, and S26 for respective drive wheels W1 and W0, after which the control leaves step #2 and further advances to the AL cycle starting from step #3.

In other words, the operation is the same as that at time $T_0$ from step S1 to S10, but because at time $T_S$ rapid acceleration begins and the drive wheel begins spinning more than the predetermined amount, the drive wheel speed SPEEDi($T_1$) becomes greater than the estimated vehicle speed VREFr($T_1$) based on the non-drive wheel. Note that point A in the figure is the drive wheel speed SPEEDi($T_1$) at time $T_1$, and $V_A$ represents this value which can be expressed as:

$$V_A = SPEED(T_1)$$

In addition, line $L_1$ represents the maximum acceleration speed for the period between time $T_0$ and time $T_1$, which is expressed as VREF (previous)+2Vg(+), or VREFi($T_0$)+2Vg(+).

As it is clear from the figure, the same operation as at time $T_0$ is performed because even at time $T_S$ the drive wheel SPEEDi($T_1$) has not accelerated more than +2Vg(+) or decelerated more than −1Vg(−) in one system cycle. At step S6, the wheel speed SPEEDi($T_1$) of the non-drive wheel is set as the non-drive wheel based estimated vehicle speed VREFi($T_1$), the estimated vehicle speed VREFr($T_1$) is set at step S9, and the wheel speed SPEEDi($T_1$) of the drive wheel is set as the estimated vehicle speed VREFi($T_1$) based on the drive wheel at step S23.

Time $T_2$

At time $T_2$ the spinning of the drive wheel has increased such that the drive wheel speed SPEEDi($T_2$) is greater than the estimated vehicle speed $VREFr(T_2)$ based on the non-drive wheel. Note that point B in the figure is the value $VREFi$ (previous)$+2Vg(+)$ at time $T_2$. In other words, since $VREFi$ (previous) at time $T_2$ is $VREFi(T_1)$ which equals $SPEEDi(T_1)$, $V_B$ which is the speed value of point B can be expressed as $SPEEDi(T_1)+2Vg(+)$.

Furthermore, line L2 represents the maximum acceleration for the period between time $T_1$ and $T_2$, which can be expressed by the estimated vehicle speed $VREF$ (previous) based on the drive wheel at time $T_1$ plus $2Vg(+)$, i.e., $VREFi(T_1)+2Vg(+)$.

Because the drive wheel speed $SPEEDi(T_1)$ is set as $VREFi(T1)$ at step S23 at time $T_1$, the estimated vehicle speed based on the drive wheel at time $T_2$ is $$VREF\text{(previous)}+2Vg(+)=SPEEDi(T_1)+2Vg(+).$$

Since it is clear that $V_B=SPEEDi(T_1)+2Vg(+)$ and $V_A=SPEEDi(T_1)$ as described in the above, $V_B$ is expressed as:

$$V_B=V_A+2Vg(+).$$

As will be known from the figure, because drive wheel speed $SPEEDi(T_2)$ is greater than the drive wheel-based estimated vehicle speed $VREFi$ (previous)$+2Vg(+)$, the control sequence at time $T_2$ repeats twice the loop through steps S2, S4, S6, S7, and S8, then advances to step S10 through step S9 and repeats twice the loop through steps S10, S11, S17, S18, S20, S21, S25, and S26, after which the control leave step #2 and further advances to the AL cycle starting from step #3.

In other words, the operation from step S1 to S10 is the same as that at time $T_1$, but drive wheel acceleration increases more than the maximum acceleration of $V2g(+)$ at time $T_2$. Therefore, it is judged "YES" at step S17 and "YES" at step 18 because the anti skid brake control is not effective yet.

At step S20, the drive wheel-based estimated vehicle speed $VREFi$ is set to $VREFi$ (previous)$+2Vg(+)$, i.e., $VREFi(T_1)+2Vg(+)$.

At step S21, the drive wheel-based estimated vehicle speed $VREFi(T_2)$ is set as $VREFMi$, and the non-drive wheel-based estimated vehicle speed $VREFr(T_2)$ is set as $VREFrMi$. As a result form the above descriptions, $VREFMi$ is expressed as point B and $VREFrMi$ as point C in the FIG. 4. Note that $V_C$ is the speed value of point C. Furthermore at step S21, the flag FLAG indicating that the drive wheel is spinning more than a predetermined amount is also set.

The control advances to step #2 and enters in the AL cycle in which the same operation as at time $T_1$ is performed and then the control passes to time $T_3$.

Time $T_3$

At time $T_3$, the control repeats twice the loop through steps S2, S4, S6, S7, and S8, advances through step S9 to S10, and then repeats the loop through steps S10, S11, S12, S13, S15, S25, and S26, after which the control leaves step #2 and advances to the AL cycle starting from step #3.

In other words, the operation is the same as that at time $T_2$ from step S1 to S10, but because the flag FLAG is set at step 12 of time $T_2$. Therefore, it is judged "YES" at step S11 and the control advances to step S12 at which the drive wheel-based temporary estimated vehicle speed TEMP is computed in accordance with the equation (5). By employment of values $VREFMi(T_2)$ and $VREFrMi(T_2)$ which were set at step S21 of time $T_2$, and the non-drive wheel-based estimated vehicle speed $VREFr(T_3)$ which was set at S9 of time $T_3$, $TEMP(T_3)$ is set as $$TEMP(T_3)=VREFMi(T_2)+VREFr(T_3)-VREFrMi(T_2).$$

Furthermore, using the values shown in the figure, $TEMP(T_3)$ may also be expressed as $$TEMP(T_3)=V_B+V_D-V_C.$$

$V_D$ is the speed value at point D for $VREFr(T_3)$.

As it is clear from the figure, because the temporary estimated vehicle speed $TEMP(T_3)$ is less than the vehicle speed SPEEDi, it is judged "NO" at step S13 and the control advances to step S15, where the value $TEMP(T_3)$ is set as the drive wheel based estimated vehicle speed $VREFi(T_3)$. In other words, "the computed estimated vehicle speed according to the present invention is adapted as the estimated vehicle speed and the procedure passes to the next time control after the AL cycle is completed.

Time $T_{f-2}$

At time $F_{f=2}$, the control repeats twice the loop through steps S2, S4, S6, S7, and S8, advances through S9 to step S10, and then repeats twice the loop through S10, S11, S12, S13, S15, S25, and S26, after which the control leaves step #2 and enters to the AL cycle starting from step #3.

In other words, from time $T_3$ to time $T_{f-2}$ the loop from step S1 to S26 is repeated at every system cycle so that TEMP is computed at step S12 in the same manner as at time $T_3$, based on the VREFMi and VREFrMi values stored at time $T_2$ but VREFr stored at every system cycle. At step S15, TEMP value, thus obtained, is set as the estimated vehicle speed based on the drive wheel. After the AL cycle is completed, the procedure passes to control at time $T_{f-1}$. Note that point E in the figure represents the value $VREFi(F_{f=2})$.

Time $T_{f-1}$

At time $T_{f-1}$, the control repeats twice the loop through steps S2, S4, S6, S7, and S8, advances through step S9 to step S10, and then repeats twice the loop through S10, S11, S12, S13, S16, S17, S22, S24, S25, and S26, after which the control leaves step #2 and enters in the AL cycle starting from step #3.

In other words, at time $T_{f-1}$, because TEMP is greater than SPEEDi, "TEMP>SPEEDi" is judged "YES" at step S13 and the control advances to step S16 where the flag FLAG is cleared. The control further advances to S17 where "SPEEDi VREFi (previous)$+V2g(+)$" is judged "NO" and further to step S22. At step S22, "SPEEDi<VREFi (previous)$-V1g(-)$", i.e., "SPEEDi$(T_{f-1})$<VREFi$(T_{f-2})-V1g(-)$" is judged "YES", and the control advances to step S24. AT step S24, the TEMP computed at step S12 is ignored and the estimated vehicle speed VREFi is set to VREFi (previous) minus $V1g(-)$ which is expressed as:

$$VREFi=\text{previous } VREFi-V1g(-).$$

After the AL cycle is completed, the procedure passes to the control at next time $T_f$.

It is to be noted that F in the figure represents VREFi (previous)−Vlg(−) at time $T_{f-1}$, i.e., VREFi($F_{f-2}$)−Vlg(−), and line L3 is a straight line of a slope representing −Vlg(−) and is passing through points E and F.

Time $T_f$

At time $T_f$, the control repeats twice the loop through steps S2, S4, S6, S7, and S8, advances through step S9 to step S10, and then repeats twice the loop through step S10, S11, S17, S22, S23, S25, and S26, after which the control leaves step #2 enters in the AL cycle starting from step #3.

In other words, at time $T_f$ the rotational speed of the drive wheel and the vehicle speed had resumed a constant and stable relationship at time Te, unlike at time $T_{f-1}$. At step S22, therefore, "SPEEDi<VREFi (previous)−Vlg(−)", i.e., "SPEEDi($T_f$)<VREFi($T_{f-1}$)−Vlg(−)" is judged "NO" and the control advances to step S23. At step S23, the estimated vehicle speed VREFi($T_f$) is set to the wheel speed SPEEDi($T_f$) and the procedure enters in the AL cycle. After the AL cycle is completed, the procedure passes to the control at next time point. Note that G in the figure represents the wheel speed SPEEDi($T_f$), i.e., the estimated vehicle speed VREFi($T_f$) at time $T_f$.

Figure 6:
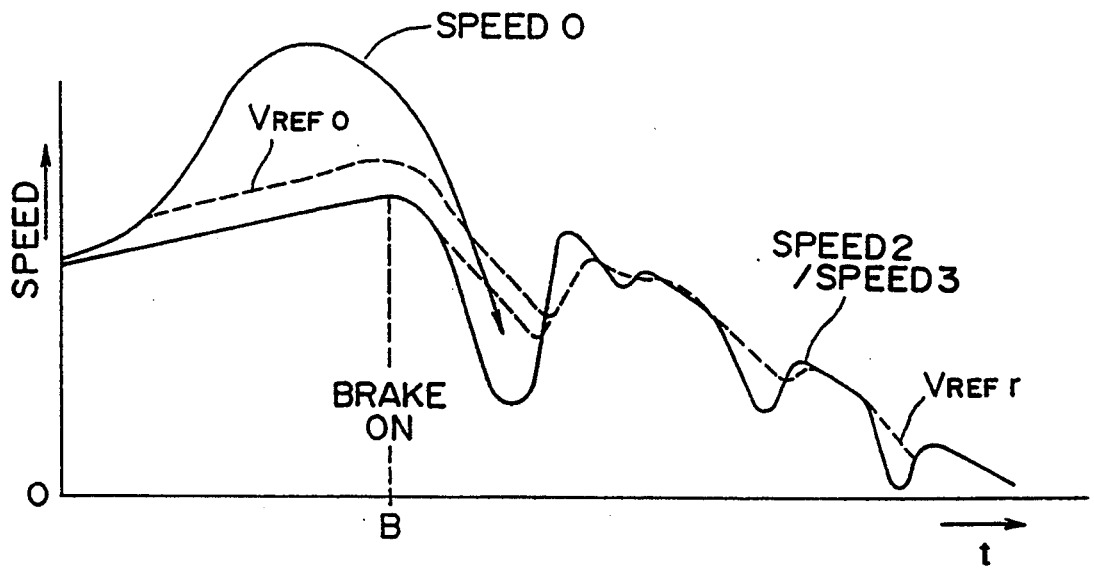
FIG. 6 is a graph showing the vehicle speed resulting from the braking operation after a rapid acceleration.

Referring to FIG. 6, it is described why the step S12 for TEMP calculation is not performed if at step S10 even only one of the anti skid control timer values TM0, TM1, TM2, and TM3 corresponding to each of the wheels W0, W1, W2, and W3 is detected as less than the predetermined amount 128, which represents that anti skid brake control is being applied to at least one of wheels.

In FIG. 6, the speed SPEED0 for the front right drive wheel W0, the estimated vehicle speed VREF0 based on the front right drive wheel W0, the non-drive wheel speeds SPEED2 and SPEED3, and the estimated vehicle speeds VREFr based on the non-drive wheel are shown. The situation is that the brakes are applied at point B so as to stop or slow the vehicle rapidly while the vehicle speed is increasing slowly but the drive wheels are spinning due to a jack-rabbit start or sudden acceleration.

This situation is the same as that between time $T_3$ and $T_{f-2}$ shown in FIG. 4, and the temporary estimated vehicle speed TEMP calculated at step S12 according to the present invention is set as the estimated vehicle speed VREFi at step S15. As it is clear from the equation (5), this temporary estimated vehicle speed TEMP reflects changes in the estimated vehicle speed VREFr based on the non-drive wheels. Furthermore, the affect of low speed acceleration/deceleration is also less than the drive wheel speed SPEED in the present invention. In this case, if the brakes are applied under this situation, the drive wheel speed SPEED0 decelerates and drops. According to the deceleration of drive wheel speed SPEED0, the non-drive wheel speed SPEEDi decelerates and the estimated vehicle speed VREFr based on the non-drive wheel drops. Furthermore, the temporal estimated vehicle speed TEMP also drops according to the estimated vehicle speed VREFr. Therefore, if thus dropped temporary estimated vehicle speed TEMP is used as the estimated vehicle speed VREF0 based on the drive wheel, the difference as expressed as VREF0−SPEED0 which is obtained in equation (1) becomes small, casing the delay of detection of wheel locking symptoms. To avoid this, the temporary estimated vehicle speed TEMP calculated at step S12 is not adapted when anti skid brake control is being applied to even one wheel.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An estimated vehicle speed computing device for computing an estimated vehicle speed based on speeds of drive wheels and speeds of non-drive wheels of said vehicle comprising:

first means for computing a first computed vehicle speed based on data other than said non-drive wheel speeds;

first means for judging, independently of said non-drive wheel speeds, whether a change of said first computed vehicle speed per unit time is greater than a predetermined level or not;

second means for computing a second computed vehicle speed based on said non-drive wheel speeds;

second means for judging whether said second computed vehicle speed is greater than said drive wheel speeds or not; and means for establishing said estimated vehicle speed such that when said first judging means judges that said change of said first computed vehicle speed per unit time is greater than said predetermined level, said second computed vehicle speed is employed as said estimated vehicle speed, and when said second judging means judges that said second computed vehicle speed is not greater than said drive wheel speeds, said second computed vehicle speed is employed as said estimated vehicle speed.

2. An estimated vehicle speed computing device as claimed in claim 1, wherein said second computing means computes said second computed vehicle speed based on said drive wheel speeds and said non-drive-wheel speeds.

3. An estimated vehicle speed computing device as claimed in claim 2, wherein said second computing means comprises a selecting means for selecting a greater one of said non-drive wheel speeds.

4. An estimated vehicle speed computing device as claimed in claim 3, further comprising:

means for storing one of said drive wheel speeds as a first stored computed vehicle speed VREFMi and said selected greater non-drive wheel speed as a third stored computed vehicle speed VREFrMi at the time when said first judging means judges that said change of said first computed vehicle speed per unit time is greater than said predetermined level;

means for detecting said selected greater non-drive wheel speed at real time as a real time third computed vehicle speed VREFr; and means for computing said second computed vehicle speed by said first stored computed vehicle speed VREFMi, said third stored computed vehicle speed VREFrMi, and said real time third computed vehicle speed VREFr based on the formula:

$$VREFMi + VREFr - VREFrMi.$$

5. An estimated vehicle speed computing device as claimed in claim 1, further comprising:
an anti skid brake control device for mounting to a vehicle wheel to control skidding.

6. An estimated vehicle speed computing device as claimed in claim 5, further comprising means for temporarily disabling said second computing means from computing said second computed vehicle speed at a time when said anti skid brake device is being operated, so that said estimated vehicle speed is related to a second computed vehicle speed just prior to operation of said anti skid brake device.

7. An estimated vehicle speed computing device as claimed in claim 1, further comprising:
a brake pressure control unit for determining whether brake pressure should be increased, decreased or maintained with respect to at least one wheel of a vehicle.

8. An estimated vehicle speed computing device as claimed in claim 1, further comprising:
a wheel speed sensor for sensing the speed of a vehicle wheel and converting the same to a signal to be sent to one of said means for computing.

9. An estimated vehicle speed computing device for computing an estimated vehicle speed based on speeds of drive wheels and speeds of non-drive wheels of said vehicle comprising:
first means for computing a first computed vehicle speed based on data other than said non-drive wheel speeds;
first means for judging whether a change of said first computed vehicle speed per unit time is greater than a predetermined level or not;
second means for computing a second computed vehicle speed based on said non-drive wheel speeds, wherein said second computing means comprises means for selecting a greater one of said non-drive wheel speeds;
second means for judging whether said second computed vehicle speed is greater than said drive wheel speeds or not;
means for storing one of said drive wheel speeds as a first stored computed vehicle speed VREFMi and said selected greater non-drive wheel speed as a third stored computed vehicle speed VREFrMi at the time when said first judging means judges that said change of said first computed vehicle speed per unit time is greater than said predetermined level;
means for detecting said selected greater non-drive wheel speed at real time as a real time third computed vehicle speed VREFr; and
means for computing said second computed vehicle speed by said first stored computed vehicle speed VREFMi, said third stored computed vehicle speed VREFrMi, and said real time third computed vehicle speed VREFr based on the formula:

$VREFMi + VREFr - VREFrMi$; and means for establishing said estimated vehicle speed such that when said first judging means judges that said change of said first computed vehicle speed per unit time is greater than said predetermined level, said second computed vehicle speed is employed as said estimated vehicle speed, and when said second judging means judges that said second computed vehicle speed is not greater than said drive wheel speeds, said second computed vehicle speed is employed as said estimated vehicle speed.

* * * * *

UNITED STATES PATENT AND TRADEMARK OFFICE
CERTIFICATE OF CORRECTION

PATENT NO. : 5,371,688
DATED : December 6, 1994
INVENTOR(S) : Hideaki FUJIOKA

It is certified that error appears in the above-indentified patent and that said Letters Patent is hereby corrected as shown below:

At column 1, line 14, change "anti skid" to ---anti-skid---.

At column 1, line 17, change "anti skid" to ---anti-skid---.

At column 1, line 47, change "shogun" to ---shown---.

At column 1, line 55, change "an" to ---a---.

At column 1, line 68, change "Judg-" to ---judg- ---.

At column 2, line 29, change "anti skid" to ---anti-skid---.

At column 2, line 31, change "flowchart" to ---flow chart---.

At column 2, line 31, change "anti skid" to ---anti-skid---.

At column 2, line 50, change "anti skid" to ---anti-skid---.

UNITED STATES PATENT AND TRADEMARK OFFICE
CERTIFICATE OF CORRECTION

PATENT NO. : 5,371,688
DATED : December 6, 1994
INVENTOR(S) : Hideaki FUJIOKA

It is certified that error appears in the above-indentified patent and that said Letters Patent is hereby corrected as shown below:

At column 2, line 67, change "anti skid" to ---anti-skid---.

At column 3, line 43, change "anti skid" to ---anti-skid---.

At column 4, line 12, change "anti skid" to ---anti-skid---.

At column 4, line 16, change "anti skid" to ---anti-skid---.

At column 4, line 18, change "anti skid" to ---anti-skid---.

At column 4, line 21, change "anti skid" to ---anti-skid---.

At column 4, line 24, change "anti skid" to ---anti-skid---.

UNITED STATES PATENT AND TRADEMARK OFFICE
CERTIFICATE OF CORRECTION

PATENT NO. : 5,371,688
DATED : December 6, 1994
INVENTOR(S) : Hideaki FUJIOKA

It is certified that error appears in the above-indentified patent and that said Letters Patent is hereby corrected as shown below:

At column 4, line 28, change "anti skid" to ---anti-skid---.

At column 4, line 28, change "greater 128" to ---greater than 128---.

At column 4, line 33, change "anti skid" to ---anti-skid---.

At column 4, line 36, change "anti skid" to ---anti-skid---.

At column 4, line 37, change "anti skid" to ---anti-skid---.

At column 4, line 37, change "in effective" to ---ineffective---.

At column 4, line 39, change "con, and" to ---command---.

At column 6, line 14, change "adopted" to ---adopted.---.

UNITED STATES PATENT AND TRADEMARK OFFICE
CERTIFICATE OF CORRECTION

PATENT NO. : 5,371,688
DATED : December 6, 1994
INVENTOR(S) : Hideaki FUJIOKA

It is certified that error appears in the above-indentified patent and that said Letters Patent is hereby corrected as shown below:

At column 7, line 1, change "anti skid" to ---anti-skid---.

At column 7, line 8, change "anti skid" to ---anti-skid---.

At column 7, line 48, change "anti skid" to ---anti-skid---.

At column 7, line 57, change "anti skid" to ---anti-skid---.

At column 8, line 9, change "anti skid" to ---anti-skid---.

At column 8, line 12, change "anti skid" to ---anti-skid---.

At column 8, line 27, change "S20" to ---S20.---.

At column 9, line 65, change "anti skid" to ---anti-skid---.

UNITED STATES PATENT AND TRADEMARK OFFICE
CERTIFICATE OF CORRECTION

PATENT NO. : 5,371,688
DATED : December 6, 1994
INVENTOR(S) : Hideaki FUJIOKA

It is certified that error appears in the above-indentified patent and that said Letters Patent is hereby corrected as shown below:

At column 9, line 66, change "anti skid" to ---anti-skid---.

At column 11, line 45, change "form" to ---from---.

At column 12, line 27, change "$F_{\ell-2}$" to ---$T_{\ell-2}$---.

At column 12, line 56, change "SPEEDi VREFi" to ---SPEEDi > VREFi---.

At column 12, line 61, change "AT" to ---At---.

At column 13, line 14, change "$T_\ell$the" to ---$T_\ell$ the---.

At column 14, line 2, change "anti skid" to ---anti-skid---.

At column 15, line 3 (claim 5, line 3), change "anti skid" to ---anti-skid---.

At column 15, line 9 (claim 6, line 5), change "anti skid" to ---anti-skid---.

At column 15, line 12 (claim 6, line 8), change "anti

UNITED STATES PATENT AND TRADEMARK OFFICE
CERTIFICATE OF CORRECTION

PATENT NO. : 5,371,688
DATED : December 6, 1994
INVENTOR(S) : Hideaki FUJIOKA

It is certified that error appears in the above-indentified patent and that said Letters Patent is hereby corrected as shown below:

skid" to ---anti-skid---.

Signed and Sealed this

Third Day of October, 1995

Attest:

BRUCE LEHMAN

*Attesting Officer*    *Commissioner of Patents and Trademarks*